May 28, 1968     B. C. FORBES ET AL     3,385,056

SELF-REGULATING FLAMEHOLDER

Filed Feb. 3, 1967     2 Sheets-Sheet 1

INVENTORS
BLAIR C. FORBES
PETER T. VERCELLONE

BY Charles A. Warren

ATTORNEY

United States Patent Office 3,385,056
Patented May 28, 1968

3,385,056
SELF-REGULATING FLAMEHOLDER
Blair C. Forbes, Rockville, and Peter T. Vercellone, New Haven, Conn., assignors to United Aircraft Corporation, East Hartford, Conn., a corporation of Delaware
Filed Feb. 3, 1967, Ser. No. 613,771
7 Claims. (Cl. 60—39.72)

ABSTRACT OF THE DISCLOSURE

A flameholder construction located in the afterburner of a gas turbine engine, each flameholder being movable and self regulating between positions of high drag and low drag, independent of any external actuating means. In addition, the flameholder construction may either extend radially across the afterburner, circumferentially around the afterburner or be a combination of both.

The invention herein described was made in the course of a contract with the United States Air Force.

Background of the invention

This invention relates to an afterburner for use with a gas turbine engine and more particularly to a flameholding construction therein.

The advent of high powered gas turbine power plants and the development of afterburners therefor has necessitated the use of flameholders to insure adequate flame propagation in the afterburner for maximum thrust generation. However, under normal high-power output of the basic power plant and high gas velocities therein, the flameholders produce considerable drag when the afterburner is not in operation. The resulting pressure drop across the flameholder reduces the thrust output of the basic power plant.

To avoid this pressure drop, the method most commonly used is a flameholder comprised of movable members, the members being actuated by external means. While this method will accomplish the desired result, it is obvious that resort to heavy structures is necessary to support these variable flameholders. This results in a weight and performance penalty, and this invention avoids this penalty.

Summary of the invention

It is a primary object of this invention to provide a flameholder mechanism which provides a maximum of turbulence when in operation and a minimum of drag and pressure loss when not in operation while not adding substantially to the overall weight of the afterburner.

The present device is a flameholder construction which is self regulating between predetermined positions of high drag and low drag. This is accomplished by resilient means which normally bias each flameholder in an open or high drag direction. These means are balanced against and oppose the force applied by a pressure differential which exists across each flameholder. Therefore, during low-flow and afterburning conditions the resilient means overcome the pressure differential force and cause the flameholders to move to a high-drag position. For high flow and nonafterburning conditions, the pressure differential force causes the flameholders to move to a low-drag position. Hence, the objective of high turbulence while afterburning and low drag when not afterburning is achieved without the addition of external actuating mechanisms and structure and with little increase to the overall weight of the afterburner.

Description of the preferred embodiments

Figure 1:
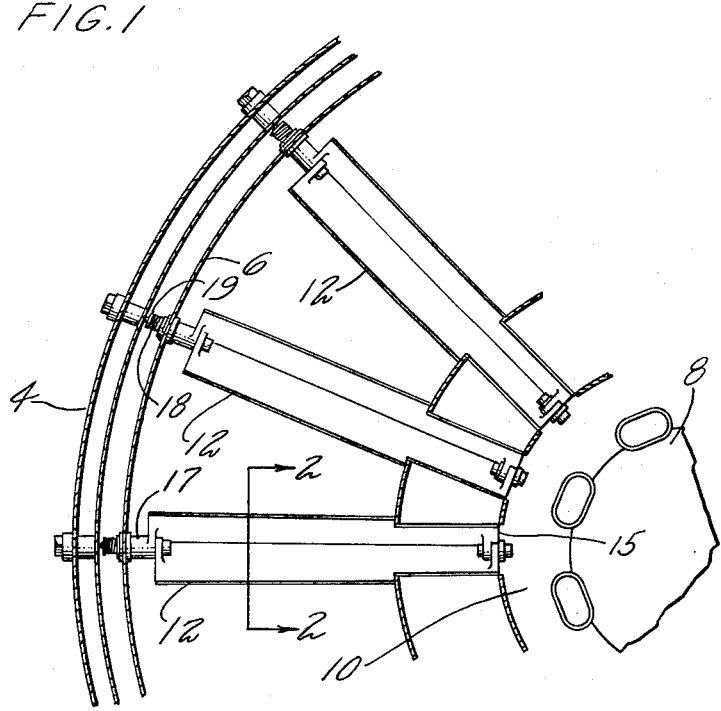
FIGURE 1 is a fragmentary sectional end view of an afterburner showing the device of the invention thereof.

Referring to FIGURE 1, there is disclosed a portion of an afterburner section of a gas turbine engine. As shown, the afterburner consists of an outer duct 4 and liner 6 spaced radially therefrom. Positioned within the afterburner and concentric with outer duct 4 is tail cone 8. Mounted around the periphery of tail cone 8 is fixed starter flameholder 10, this flameholder insuring that there is always a means of propagating the flame within the afterburner.

Figure 2:
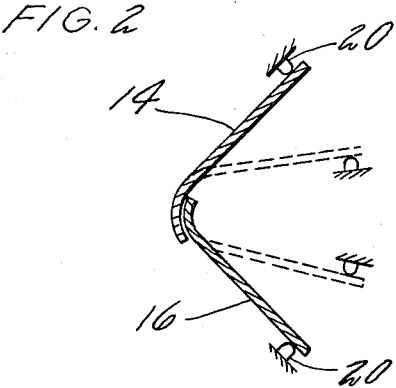
FIGURE 2 is a schematic sectional view along line 2—2.

Extending radially between liner 6 and starter flameholder 10 is a plurality of flameholders 12. Flameholders 12 are of the gutter type with the apex of the gutter facing upstream with respect to the axis of flow through outer duct 4. As best shown in FIGURE 2, flameholder 12 is comprised of member 14 and member 16, members 14 and 16 cooperating with each other and forming the gutter-type structure. In the present embodiment, the inner end 15 of member 14 is connected to starter flameholder 10 and the outer end 17 is connected to liner 6. The shaft ends 15 and 17 of member 14 are hollow and extending therethrough and moveable therein are the shaft ends of member 16. Mounted on the outer shaft end of member 16 is resilient means 18, resilient means being held in place by retainer 19. It should be understood that both member 14 and member 16 may be movable and that resilient means may be located at the inner and outer ends of the cooperating members. Cooperating members 14 and 16 are biased to maintain them in an open or position of high drag by resilient means 18. In the embodiment shown, resilient means 18 is a torsion spring and is mounted on the outer end of each flameholder 12 between liner 6 and outer duct 4. As a result of locating resilient means 18 in the radial space between duct 4 and liner 6, the resilient means are cooled by the flow of cooling air normally passing between liner 6 and duct 4. Stop means 20 limit the movement of cooperating members 14 and 16 in the open or high-drag direction.

It should be clear that acting across each flameholder 12 is a pressure differential. The force or torque applied by this pressure differential opposes that applied by resilient means 18. Under low-flow and afterburning conditions, the pressure differential across flameholder 12 is small; and since these conditions require a flameholder in an open or high-drag position, resilient means 18 are sized to counterbalance the force applied to cooperating members 14 and 16, thereby causing them to move outwardly to the desired high-drag position. Likewise during high-flow and nonafterburning conditions when minimum flameholder blockage is desired, the force applied to cooperating members 14 and 16, resulting from the pressure differential across the flameholder, is greater than the opposing force applied by the resilient means. Therefore, cooperating members 14 and 16 are caused to move inward to a low-drag position. Stop means 22 limits the movement of cooperating members 14 and 16 in the closed or low-drag direction. It is to be understood that cooperating members 14 and 16 may take any position intermediate of stop means 20 and 22, the position being determined by the difference between the force applied by the pressure differential and the force applied by resilient means 18.

Figure 3:
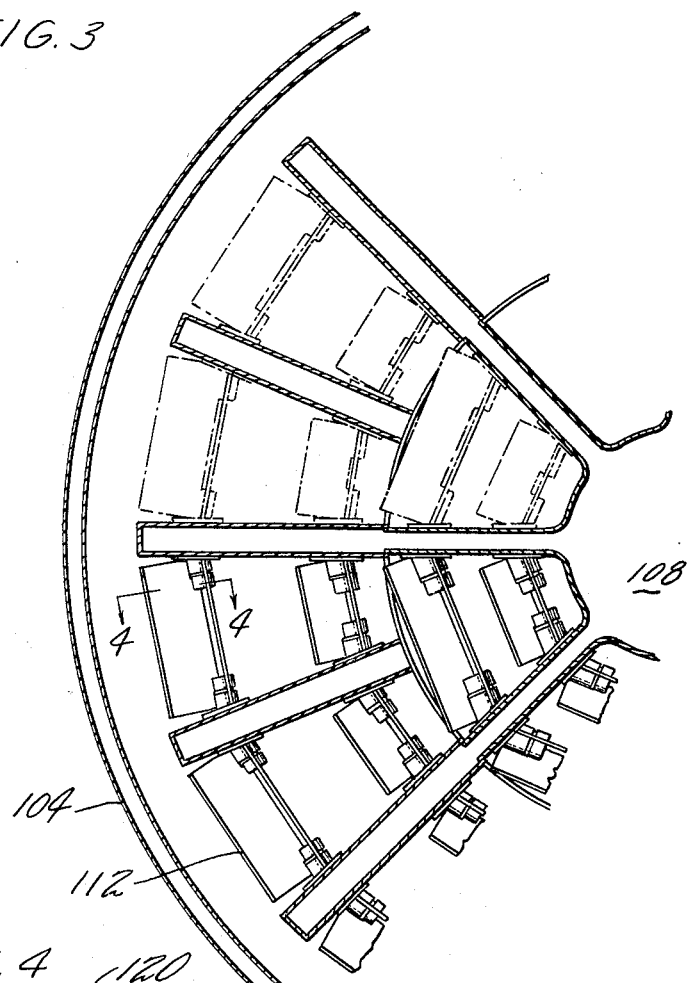
FIGURE 3 is a fragmentary sectional end view of an afterburner showing a second embodiment of the device of the invention.
Figure 4:
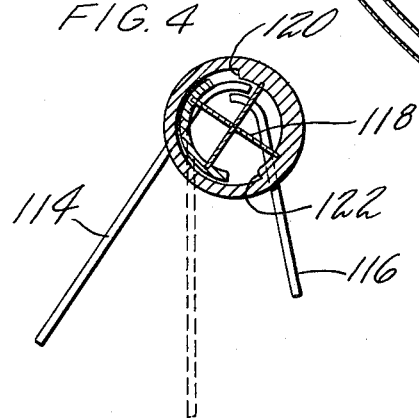
FIGURE 4 is a schematic sectional view along line 4—4.

FIGURES 3 and 4 illustrate a second embodiment of the invention. One distinction between the two embodiments is that FIGURES 3 and 4 illustrate flameholders 112 that extend circumferentially around the afterburner. Flameholders 112 are positioned within outer duct 104 around tail cone 108.

Flameholders 112 are of the gutter type with the apex of the gutter directed upstream with respect to the axis of flow through duct 104. As best shown in FIGURE 4, flameholder 112 is comprised of members 114 and 116, member 114 being movable and member 116 being fixed. It is to be understood that both members can be movable; however, in the present embodiment only member 114 is movable. Attached to members 114 and 116 and biasing member 114 in an open or high-drag direction is resilient means 118. In this embodiment, resilient means 118 is illustrated as a leaf spring or flexure pivot bearing. Stop means 120 and 122 limit the movement of member 114 in the open and closed direction, member 114 being actuated in the same manner as member 14 of FIGURES 1 and 2.

It is to be understood that the invention is not limited to the specific embodiments herein illustrated and described, but may be used in other ways without departure from its spirit as defined by the following claims.

We claim:
1. A flameholder construction disposed in the duct of an afterburner, wherein the improvement comprises:
   each flameholder comprised of cooperating members forming a gutter-shaped structure, at least one cooperating member being movable, the open end of said gutter structure being directed downstream with respect to the axis of flow through said afterburner duct,
   resilient means by which the cooperating members are normally biased to a position of high drag, the pressure differential across said gutter-shaped structure opposing said resilient means thereby urging cooperating members to a position of lower drag, said resilient means being balanced against the pressure differential across said gutter-shaped structure so that during high flow and nonafterburning conditions said pressure differential causes said cooperating members to move to a position of low drag and during low-flow and afterburning conditions said cooperating members to a position of high drag thereby creating a region of stagnancy sufficient to effect flame retention.

2. A construction as in claim 1, in which:
   stop means are provided to limit the movement of said cooperating members so that predetermined positions corresponding to high drag and low drag are not exceeded.

3. A flameholder construction disposed in the duct of an afterburner, wherein the improvement comprises:
   each flameholder being comprised of cooperating members forming a gutter-shaped structure, at least one cooperating member being movable, the apex of said gutter structure being directed upstream with respect to the axis of flow through said afterburner duct, said gutter structure extending radially across said afterburner duct;
   means for supporting said radially extending gutters structure within said afterburner duct;
   resilient means by which the cooperating members are normally biased to a position of high drag, the pressure differential across said radially extending gutter-shaped structure opposing said resilient means, said resilient means being balanced against the pressure differential across said radially extending gutter-shaped structure so that during high-flow and non-afterburning conditions said pressure differential causes said cooperating members to move to a position of low drag and during low-flow and afterburning conditions said resilient means urges said cooperating members to a position of high drag thereby creating a region of stagnancy sufficient to effect flame retention.

4. A construction as in claim 3, in which:
   said afterburner includes a liner positioned within and concentric with said afterburner duct, and
   said resilient means are attached to the outer end of said radially extending gutter structure between said liner and said duct so that said resilient means is not in the hot gas stream and is cooled by cooling air flowing between said liner and said duct.

5. A construction as in claim 3, in which:
   stop means are provided to limit the movement of said cooperating members so that predetermined positions corresponding to high drag and low drag are not exceeded.

6. A flameholder construction disposed in the duct of an afterburner, wherein the improvement comprises:
   each flameholder being comprised of cooperating members forming a gutter-shaped structure, at least one cooperating member being movable, the apex of said gutter structure being directed upstream with respect to the axis of flow through said afterburner duct, said gutter structure extending circumferentially around the duct;
   means for supporting said circumferentially extending gutter structure within said afterburner duct; and
   resilient means by which the cooperating members are normally biased to a position of high drag, the pressure differential across said circumferentially extending gutter-shaped structure being balanced against said resilient means so that during high-flow and nonafterburning conditions said pressure differential causes said cooperating members to move to a position of low drag and during low-flow and afterburning conditions said resilient means urges said cooperating members to a position of high drag thereby creating a region of stagnancy sufficient to effect flame retention.

7. A construction as in claim 6, in which:
   stop means are provided to limit the movement of said cooperating members so that predetermined positions corresponding to high drag and low drag are not exceeded.

References Cited

UNITED STATES PATENTS

| 2,835,108 | 5/1958 | Karen | 60—39.72 |
| 2,866,313 | 12/1958 | Holl | 60—39.72 XR |
| 2,875,580 | 3/1959 | Moy et al. | 60—39.72 |
| 2,899,799 | 8/1959 | Setterblade | 60—39.72 |

JULIUS E. WEST, *Primary Examiner.*